Dec. 8, 1925.

J. H. HJUL 1,564,482

CHECK HOLDER AND RECORD

Filed Feb. 4, 1924   2 Sheets-Sheet 1

Inventor
JAMES. H. HJUL.

By White Frost & Evans
his Attorneys

Louis Serventi.

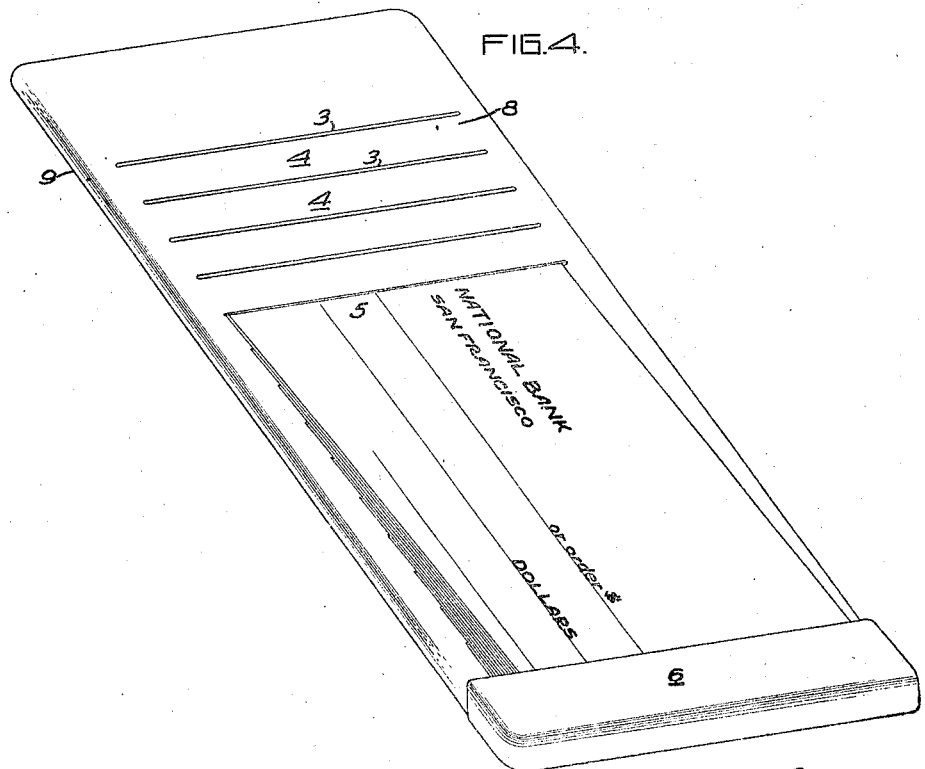
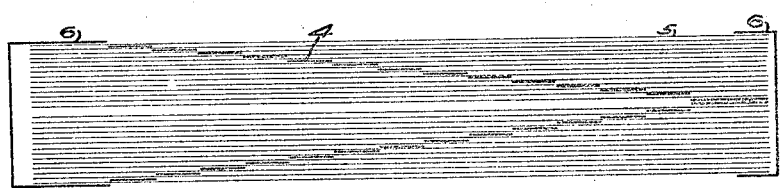

Patented Dec. 8, 1925.

1,564,482

UNITED STATES PATENT OFFICE.

JAMES H. HJUL, OF SAN FRANCISCO, CALIFORNIA.

CHECK HOLDER AND RECORD.

Application filed February 4, 1924. Serial No. 690,457.

*To all whom it may concern:*

Be it known that I, JAMES H. HJUL, a citizen of the United States, and a resident of the city and county of San Francisco, State of California, have invented a certain new and useful Check Holder and Record, of which the following is a specification.

The invention relates to devices for holding what may be generically termed commercial instruments, that is, bank checks, bills, notes, receipts or other instruments of mercantile or commercial transactions.

An object of the invention is to provide a check holder which comprises a flat sheet or envelope having spaces thereon to receive entry of the check record, so that when the supply of checks is exhausted, the empty flat holder may be readily filed for reference.

Another object of the invention is to provide a check holder which eliminates the use of stubs thereby overcoming the necessity of the repeated turning of stubs when it is desired to examine the check record.

Another object of the invention is to provide a check holder and record which will eliminate the carrying forward of the balance from one stub to another, as checks are written.

A further object of the invention is to provide a check holder and record which comprises, in effect, a ledger sheet which displays the check record of a large number of checks.

The invention possesses other advantageous features, some of which, with the foregoing, will be set forth at length in the following description, where I shall outline in full those forms of my invention which I have selected for illustration in the drawings accompanying and forming part of the present specification. In said drawings I have shown several forms of check holders embodying my invention, but it is to be understood that I do not limit myself to such forms, since the invention, as set forth in the claims, may be embodied in a plurality of other forms.

Referring to said drawings:

Figure 4 is a perspective view of a check holder and record embodying my invention and formed as an envelope, several of the checks being withdrawn.

Figure 5 is a longitudinal section through one form of envelope check holder embodying my invention.

Figure 6 is a longitudinal section on an exaggerated scale of a modified form of envelope check holder embodying my invention in which a plurality of checks is associated with each face of the envelope.

Figure 1:
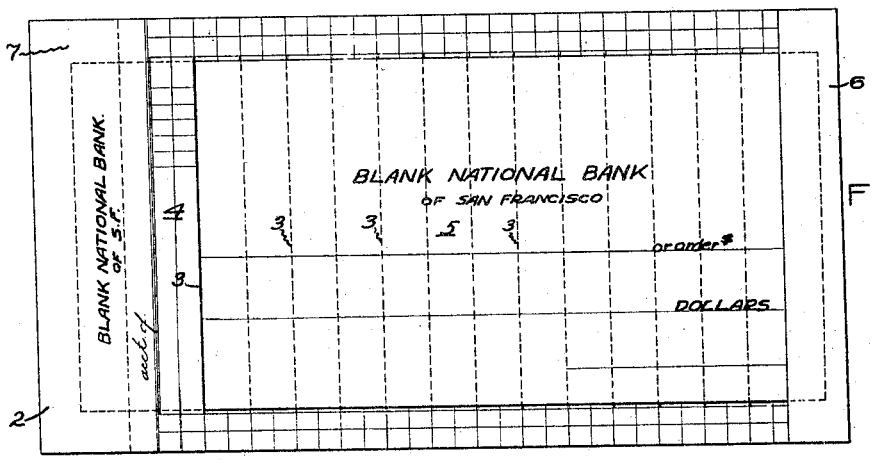
Figure 1 is a view of the front face of a check holder embodying my invention with a full supply of checks contained therein.
Figure 2:
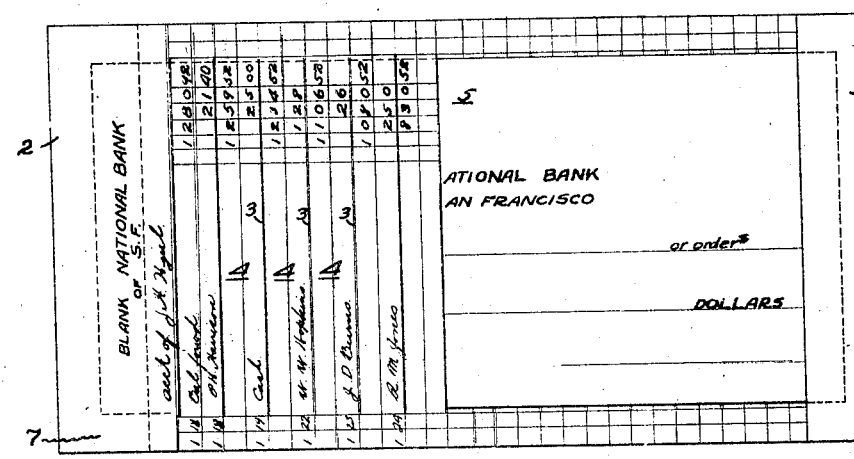
Figure 2 is a view of the front face of one form of check holder embodying my invention, from which several of the checks have been withdrawn and on which the entries of the record of the withdrawn checks have been made.
Figure 3:
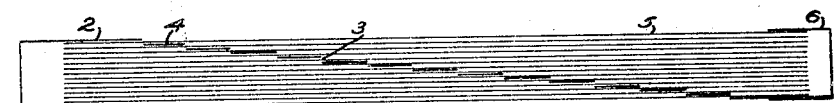
Figure 3 is a longitudinal section on an exaggerated scale, of the check holder shown in Figure 1.

Check holders and records have, in the past, usually comprised a series of sheets bound together at one end, each sheet comprising a check blank and a stub. As the check is drawn, the record is made on the stub and the balance is carried forward to the next stub. After all of the checks in the book have been used the remaining bunch of stubs, which are the record of the issued checks, is of awkward shape and difficult to file and preserve and difficult and tedious to examine when it is desired to audit the check record. One of the objects of my invention is to provide a check record which does not include stubs, so that the bother and disadvantage of stubs may be eliminated. In accordance with my invention I arrange the checks in association with a flat sheet or envelope which is so constructed that it readily holds a plurality of checks and provides spaces for the entry of the check record. This flat sheet or envelope may readily be filed in the modern filing systems and presents on a single surface the record of a large number of checks, so that the record may be readily audited. The check holder of my invention may comprise a single sheet or it may comprise an envelope having two faces. In Figures 1, 2 and 3 of the drawings I have shown the invention embodied in a single sheet and in Figures 4, 5 and 6 I have shown the invention embodied in an envelope. When an envelope is used, I may employ both faces of the envelope as a check record or only one face, as requirements dictate.

Referring first to the embodiment of the invention shown in Figures 1, 2 and 3, the device comprises a sheet 2 of suitable width and length, depending upon the size of the checks to be accommodated. The sheet is provided with a plurality of regularly spaced parallel slits 3 extending across the sheet. The slits 3 are separated by strips 4 which are formed by cutting the slits. The slits are somewhat longer than the width of the checks to permit the checks to be passed through the slits. A check 5 is passed through each slit so that a plurality of checks arranged in superposed relation are associated with each sheet, a part of each check lying behind the sheet and a part lying in front of the sheet. The checks pass through the successive slits so that greater portions of the successive checks lie behind the sheet. As a check is withdrawn from the sheet, the strip 4 lying below the slit through which the check is withdrawn is uncovered, so that every time a check is withdrawn a successive strip is exposed. The records of the checks are entered on the strips so that there is always presented on the sheet, the records of the checks which have previously been drawn. The uppermost strip is preferably exposed before the uppermost check has been withdrawn so that the balance and the amount for which the first check is drawn may be entered on the uppermost strip and after the check has been withdrawn the resulting balance is placed on the strip exposed by the withdrawal of the check. The strips 4 are ruled in any desired manner to accommodate the data that it is desired to enter thereon. It is preferable to provide these strips with vertical lines to provide spaces for the entry of the dates and with horizontal spaces to receive the name of the payee and with vertical lines to receive the amount of the check. When desired the sheets may also be ruled on their front face to receive entry of deposits made. After all of the checks have been used, the sheet may be filed away for reference and, on account of its nature, lends itself readily to examination and audit. At the bottom of the sheet 2 there is preferably provided a pocket 6 into which the ends of the superposed checks extend for the purpose of retaining the checks in the holder. This pocket 6 is formed on the front side of the sheet. When desired, a similar pocket 7 may be provided on the rear face of the sheet at its upper end to retain the opposite end of the checks. The checks are preferably not otherwise secured in position, so that they may be readily withdrawn.

In Figures 4, 5 and 6 I have shown the invention embodied in an envelope so that those portions of the checks which extend through the slit to the under side of the sheet are contained within the envelope. The front face 8 of the envelope 9 is provided with slits 3 and strips 4, as described in connection with the sheet shown in Figure 1, and with checks 5 extending through the successive slits. At its lower end the envelope is provided with a pocket 6 for retaining the lower ends of the checks and preventing the checks from becoming displaced. The front face of the envelope, which is progressively uncovered by the withdrawal of the checks, may be ruled in any suitable manner to receive the check record. The front face of the envelope may be ruled to indicate withdrawals only and the rear face of the envelope may be ruled to receive the entry of deposits.

Instead of providing only the front face 8 of the envelope with slits 3 to receive checks, both the front and the rear faces may be provided with slits, as shown in Figure 6, whereby two bunches of checks may be held by a single envelope. When this latter construction is used, the envelope may be closed at its upper end to prevent the displacement of checks in that direction and may be provided at its lower end with pockets 6 on the outside of both faces, to retain the lower ends of the checks. The envelope form appears to possess several advantages over the sheet form, since it insures better protection to the checks. The envelope may be made of any suitable material, such as heavy paper or cloth-reinforced paper or other suitable material. The rulings on the faces of the envelope to provide line enclosed areas for receiving the check or check and deposit records may be varied, in individual instances, to best suit the requirements.

Instead of forming the strips by cutting slits in a sheet, the strips may be formed separately and pasted or otherwise secured at their ends to a sheet, so that the same effect is produced. In making the holders, it may be advantageous to arrange the strips in a bunch of checks, there being one strip between each two checks and the strips being arranged in the step formation shown in Fig. 3. The bunch of checks with the ends of the strips projecting therefrom may then be superposed on a sheet or backing and the projecting ends of the strips secured to the backing. Many methods of manufacture and assembly may be developed which will provide the series of strips between which the checks are arranged in the manner set forth.

I claim:

1. A check holder comprising a sheet having a plurality of spaced slits therein and readily removable checks passing through the slits and lying partly on opposite sides of the sheet, said checks being unattached to the sheet, said checks adapted to be readily withdrawn through the slits.

2. A check holder comprising a sheet having a plurality of spaced parallel slits therein and a readily removable check passing through each slit, said checks adapted to be readily withdrawn through the slits and the plurality of checks being arranged in registering superposed relation.

3. A check holder comprising a sheet having a plurality of spaced parallel slits therein separated by strips of the sheet, and readily removable checks passing through the slits, the removal of the uppermost check serving to uncover the strip contiguous to the slit from which the check was removed and to expose the nether check.

4. A check holder comprising a sheet having a plurality of spaced slits therein separated by strips of the sheet, a check passing through each slit, the plurality of checks being arranged in superposed relation, the removal of the uppermost check serving to uncover the strip contiguous to the slit from which the check was removed, said strip being adapted to receive the record of such check.

5. A check holder comprising a sheet having a plurality of spaced slits therein, a readily removable check passing through each slit, the plurality of checks being arranged in superposed relation and means for retaining the checks in such relation.

6. A check holder comprising a sheet having a plurality of spaced slits therein, a check passing through each slit, the plurality of checks being arranged in superposed relation and a pocket at one end of the sheet to retain the checks in position.

7. A check holder and record comprising a sheet having a plurality of spaced parallel slits therein separated by strips of the sheet, said strips being ruled to receive entry of the check record.

8. A check holder comprising an envelope having one face thereof provided with a plurality of spaced slits and checks passing through the slits and lying partly within and partly without the envelope.

9. A check holder comprising an envelope having one face thereof provided with a plurality of parallel, spaced slits, and a check passing through each slit, the plurality of checks being in superposed relation.

10. A check holder comprising an envelope having one face thereof provided with a plurality of parallel, spaced slits, a check passing through each slit, the plurality of checks being disposed in superposed relation and a pocket at one end of the envelope for retaining one end of the layer of checks.

11. A check holder comprising an envelope having both faces thereof provided with series of spaced slits and checks passing through said slits, the checks lying partly within and partly without the envelope.

12. A check holder comprising an envelope having both faces thereof provided with series of spaced slits, checks passing through said slits and means engaging both ends of said check for retaining the checks in position.

13. A check holder comprising an envelope having one face thereof provided with a plurality of spaced slits separated by strips of the face, said strips being ruled to receive entry of the check record.

14. A check holder comprising an envelope having each face thereof provided with a plurality of spaced slits separated by strips of the faces, said strips being ruled to receive entry of the check record.

In testimony whereof, I have hereunto set my hand.

JAMES H. HJUL.